(12) United States Patent
de Bastos Reis Portugal et al.

(10) Patent No.: US 7,775,390 B2
(45) Date of Patent: Aug. 17, 2010

(54) COOKING VESSEL

(75) Inventors: Mario de Bastos Reis Portugal, Mansores (PT); Peter Rommerskirchen, Wuppertal (DE)

(73) Assignee: Gero Vertriebs GmbH, Wuppertal (DE)

( * ) Notice: Subject to any disclaimer, the term of this patent is extended or adjusted under 35 U.S.C. 154(b) by 591 days.

(21) Appl. No.: 11/570,929

(22) PCT Filed: Nov. 21, 2005

(86) PCT No.: PCT/DE2005/002085

§ 371 (c)(1),
(2), (4) Date: Dec. 19, 2006

(87) PCT Pub. No.: WO2006/056173

PCT Pub. Date: Jun. 1, 2006

(65) Prior Publication Data

US 2008/0290092 A1    Nov. 27, 2008

(30) Foreign Application Priority Data

Nov. 23, 2004  (DE) ................ 10 2004 056 463

(51) Int. Cl.
  *B65D 45/34* (2006.01)
  *A47J 27/08* (2006.01)
  *A47J 27/00* (2006.01)
(52) U.S. Cl. .................. 220/321; 220/573.1
(58) Field of Classification Search ............. 220/319, 220/320, 321, 573.1
See application file for complete search history.

(56) References Cited

U.S. PATENT DOCUMENTS 1,482,049 A * 1/1924 Swanson ............... 220/321
2,102,908 A * 12/1937 Nelson ................ 292/256.67

(Continued)

FOREIGN PATENT DOCUMENTS

EP       0 491 324 B1   6/1992
WO       9203080        3/1992

OTHER PUBLICATIONS

German Examination Report dated Sep. 9, 2005, received in correponding priority application No. DE 10 2004 056 463.9, 2 pgs.

(Continued)

*Primary Examiner*—Anthony Stashick
*Assistant Examiner*—Niki M Eloshway
(74) *Attorney, Agent, or Firm*—Grossman Tucker Perreault & Pfleger, PLLC

(57)    ABSTRACT

The invention relates to a cooking vessel (1), particularly a steam pressure cooker, comprising a pot-like container and a lid (3) provided for pressure-tight sealing of the container. The container displays a circumferential, outwardly bent or flanged pot edge. Clamping jaws (6) are provided on the lid (3), which serve as locking segments and can be moved into an open or locked position parallel to the plane of the pot edge (5), where the clamping jaws (6) reach under the pot edge in locked position. The invention is characterized by the fact that the clamping jaws (6) each extend over almost half the circumference of the lid (3) and that the clamping jaws (6) are mounted in a manner permitting pivoting movement about a pivot (12) extending parallel to, and at a distance from, the longitudinal centre line of the container (FIG. 5)

9 Claims, 3 Drawing Sheets

U.S. PATENT DOCUMENTS

Figure 1:
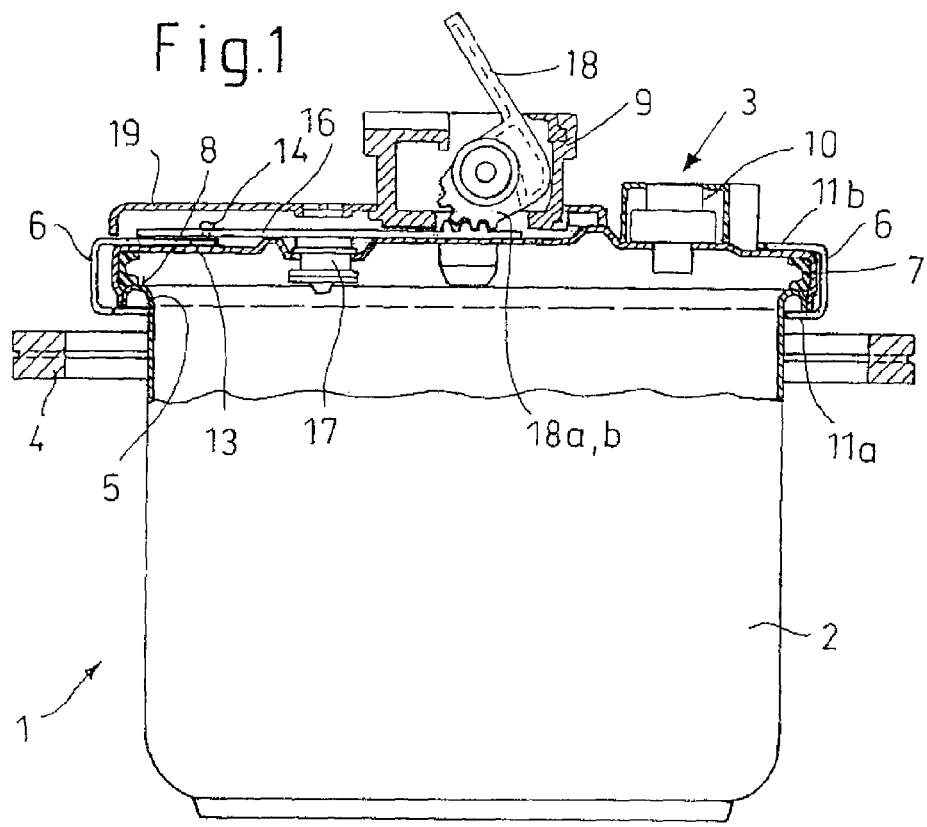

| | | | | |
|---|---|---|---|---|
| 2,130,701 | A | * | 9/1938 | Thomas ...................... 220/321 |
| RE26,127 | E | * | 12/1966 | Wade .......................... 220/321 |
| 4,288,001 | A | * | 9/1981 | Lankston .................... 220/316 |
| 4,294,377 | A | * | 10/1981 | Chen .......................... 220/321 |
| 4,331,251 | A | * | 5/1982 | Berman et al. ............. 220/4.21 |
| 4,457,445 | A | * | 7/1984 | Hanks et al. ................ 220/214 |
| 4,711,366 | A | * | 12/1987 | Chen .......................... 220/316 |
| 5,613,424 | A | | 3/1997 | Chameroy et al. |
| 5,906,289 | A | * | 5/1999 | Aliesch et al. .............. 220/318 |
| 5,908,210 | A | * | 6/1999 | Fetzer ......................... 285/24 |
| 6,116,151 | A | * | 9/2000 | Fickert et al. ................. 99/337 |
| 6,540,097 | B1 | * | 4/2003 | Beck et al. ................... 220/321 |

OTHER PUBLICATIONS

EPO Examination Report dated Feb. 16, 2007, received in corresponding application No. EP 05 817 027.5, 3 pgs.

International Search Report dated Feb. 21, 2006, received in corresponding application No. PCT/DE05/002085, 3 pgs.

English translation of the Preliminary Report on Patentability received in corresponding international Application No. PCT/DE2005/002085, 2 pgs.

English translation of the Written Opinion received in corresponding international Application No. PCT/DE2005/002085, 5 pgs.

* cited by examiner

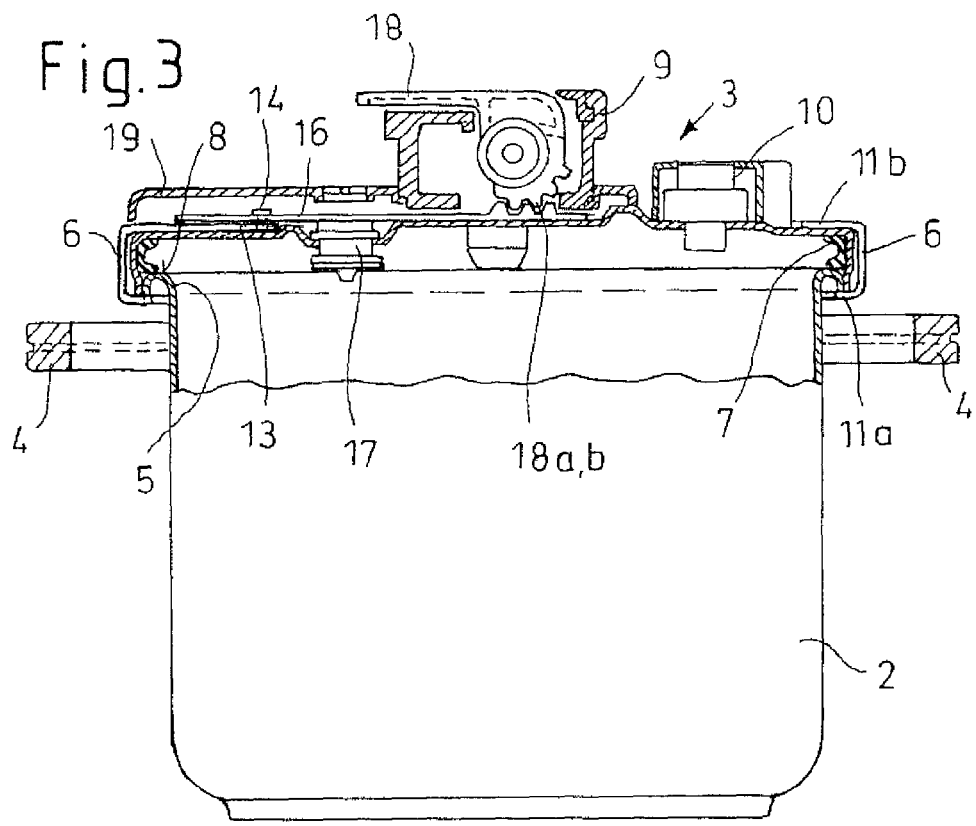
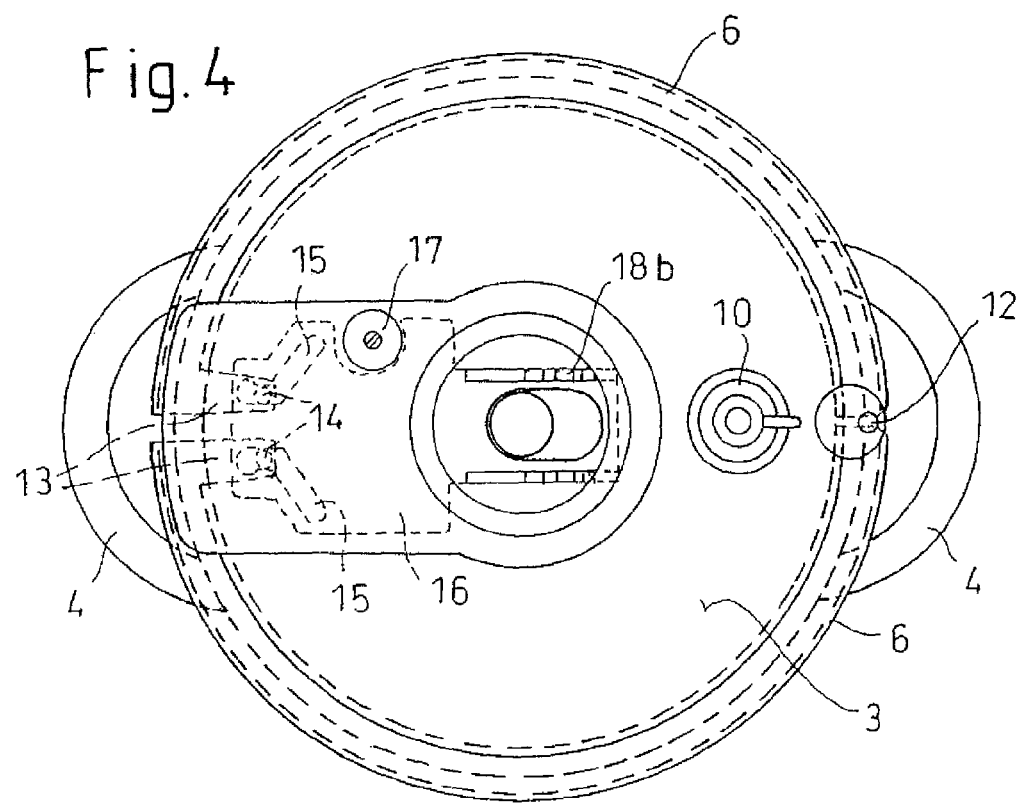

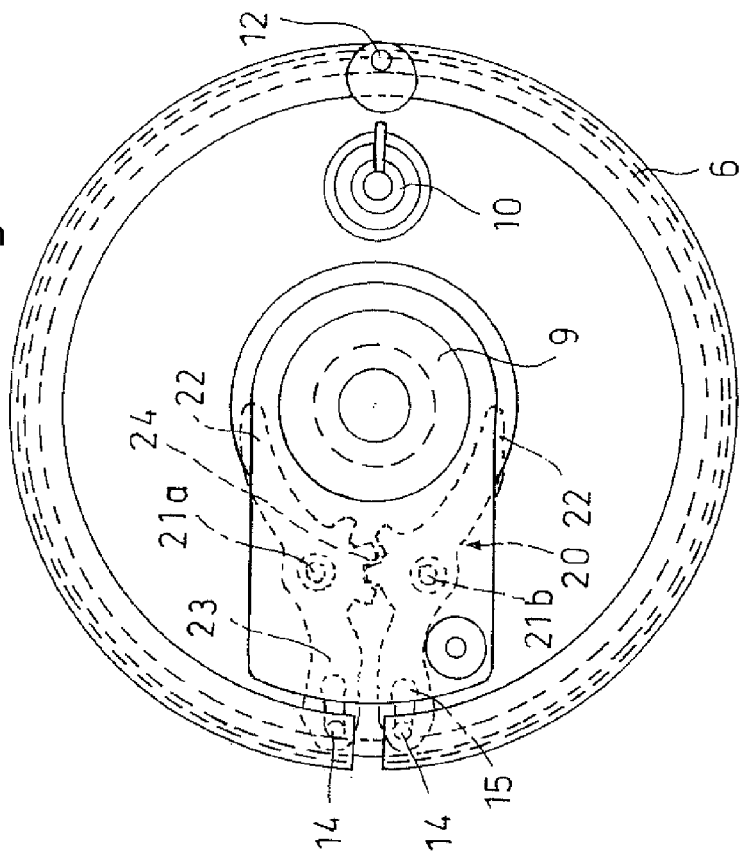
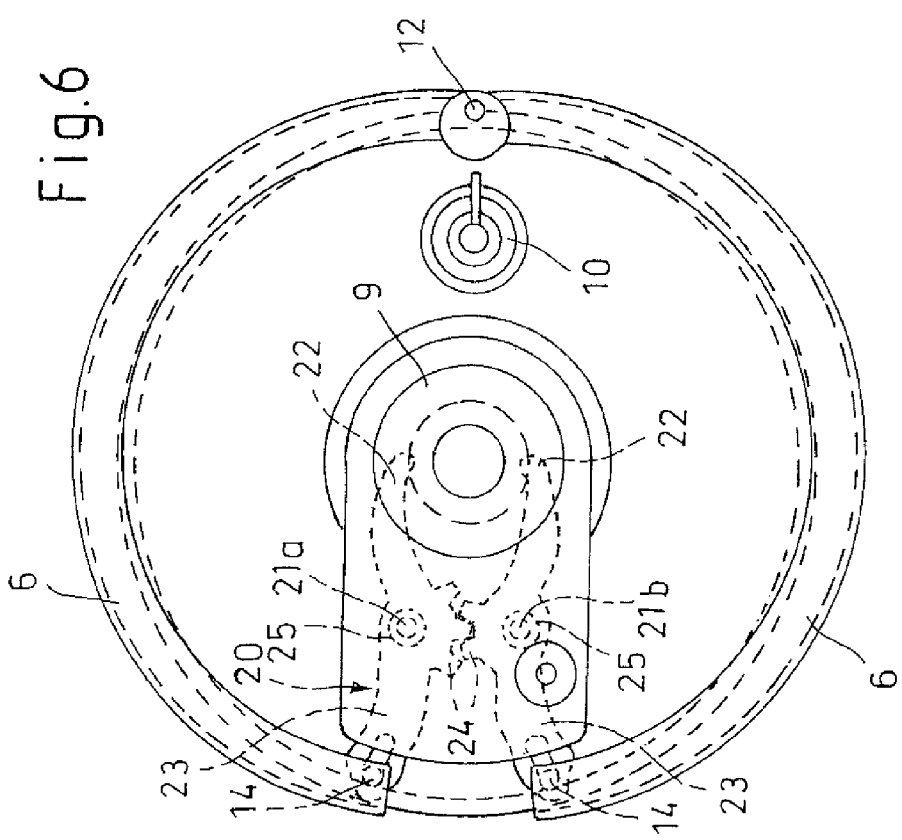

COOKING VESSEL

The invention relates to a cooking vessel, particularly a steam pressure cooker, comprising a pot-like container and a lid provided for pressure-tight sealing of the container, where the container displays a circumferential, outwardly bent or flanged pot edge, where clamping jaws are provided on the lid, which serve as locking segments and can be moved into an open or locked position parallel to the plane of the pot edge, and where the clamping jaws reach under the pot edge in locked position.

A cooking vessel of this kind is known from DE 4026166 A1, for example. There, the lid is fixed on the container by providing two diametrically opposite circumferential claws on the lid, which extend downwards and inwards and reach under the pot edge in locked state. These locking segments designed as circumferential claws can be radially extended and retracted by means of an axially movable control button, this resulting in locking or releasing of the lid and the container.

This locking mechanism is advantageous inasmuch as no exact positioning of the lid on the container is necessary in order to seal the container in pressure-tight fashion. The known cooking vessel does, however, have the disadvantage that the mechanism for locking and releasing the lid requires the application of relatively great force by the user.

To solve this problem, DE 29510989 proposes a pressure cooker on which radially movable clamping jaws, arranged diametrically opposite each other, are provided in a similar manner, the movement of which is brought about by a radially movable control element located on the lid. The control element is operated via a control button located on the lid in axially movable fashion, in a manner similar to that already proposed in DE 4026166. This solution may be more favourable than the solution described in DE 4026166 in terms of the necessary operating forces, although it is in principle kinematically complicated and unfavourable to convert an axial movement of the control button into a radial movement of the clamping jaws.

Moreover, the known solutions have the disadvantage that the radial opening and closing movement of two, diametrically opposite clamping jaws is unfavourable, both as regards the stroke length or operating travel and in terms of the force required as a result of the leverage. Finally, a solution of this kind also requires relatively high clamping forces in the locked position of the lid.

The object of the invention is therefore to further develop a cooking vessel of the type mentioned in the opening paragraph in such a way that the disadvantages described above are avoided.

The object is solved by a cooking vessel with the features of the generic part of Claim 1, which is characterised by the fact that the clamping jaws each extend over almost half the circumference of the lid and that the clamping jaws are mounted in a manner permitting pivoting movement about a pivot extending parallel to, and at a distance from, the longitudinal centre line of the container.

As a result, the clamping jaws almost completely surround and completely reach under the pot edge, this being favourable both in terms of safety and as regards the resultant leverage for closing and opening the clamping jaws. A control element bringing about the opening and closing movement of the clamping jaws can, for example, act on one end of the clamping jaws, whereas the mount for the clamping jaws can be provided on the diametrically opposite side of the pot edge.

The clamping jaws are preferably connected to each other via a common pivot, which extends through the edge area of the lid. Expediently, the pivot then simultaneously serves for captive fastening of the clamping jaws to the lid.

In a particularly preferred variant of the cooking vessel according to the invention, provision is made for the ends of the clamping jaws remote from the pivot to be connected in pivoting fashion to control levers, which are in turn each mounted on the lid in pivoting fashion and transmit an opening and closing movement to the clamping jaws. This arrangement has the advantage that deflection of the control or operating forces into the plane of the pot edge is not necessary, meaning that this design is particularly characterised by low necessary operating forces on the part of the user.

It is advantageous if the control levers each display an operating arm and a guide arm, where the guide arm is in each case actively connected to a clamping jaw. The clamping jaws can in each case be guided in openings in the guide arms via driving elements, such as driving pins. In this case, the driving pins and the openings form a sliding guide for the pivoting movement of the control levers.

It is particularly advantageous if the pivoting movement of the control levers is coupled via a synchronisation device. The control levers can, for example, be arranged relative to each other in the manner of scissor arms, engaging each other via toothing, such that operation of the levers results in synchronous movement of the clamping jaws.

It is particularly expedient if the clamping jaws are retained in the closed position by spring force.

In an alternative variant of the cooking vessel according to the invention, provision is made for the clamping jaws to be guided via driving elements in openings in a control plate, which, in turn, can be displaced in linear fashion via an operating element and brings about an opening and closing movement of the clamping jaws. Together with the driving elements of the clamping jaws, the control plate again forms a sliding guide for the clamping jaws.

It is particularly advantageous if the control plate displays a rack and the operating element is designed as a toothed lever engaging the rack. In this way, displacement of the control plate can be brought about by a pivoting movement of an operating arm, this offering the additional possibility of achieving easy-running operation with low control forces via the selectable leverage.

The invention is described below on the basis of a practical example explained in the drawings.

Figure 2:
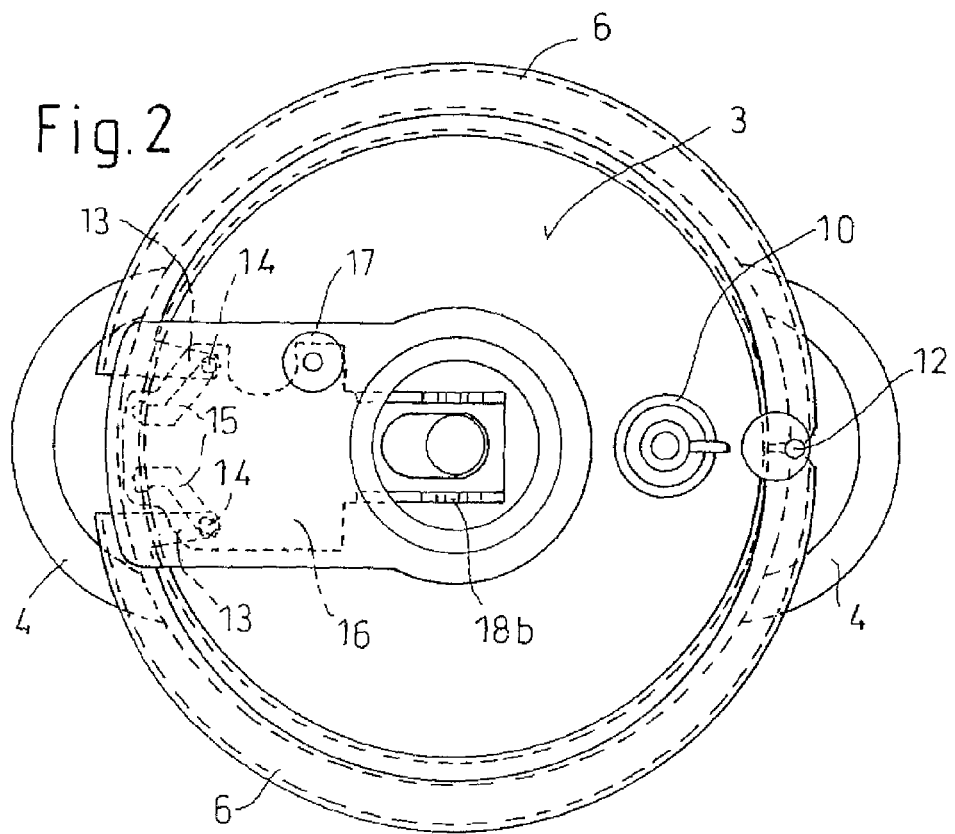

The drawings show the following:

FIG. 1 A schematic view of the cooking vessel according to the invention pursuant to a practical example, partly as a sectional drawing, FIG. 2 A schematic top view of the cooking vessel illustrated in FIG. 1, FIG. 3 The cooking vessel illustrated in FIG. 1, in locked state, FIG. 4 A schematic top view of the cooking vessel illustrated in FIG. 3, FIG. 5 A schematic top view of a cooking vessel pursuant to another practical example according to the invention, with locked lid, and FIG. 6 A schematic top view of the cooking vessel illustrated in FIG. 5, with released lid.

Cooking vessel 1 according to the invention is designed as a pressure cooking vessel or pressure cooker with a pot 2 and a lid 3 for pressure-tight sealing of pot 2. Pot 2 comprises two handles 4, as well as an edge 5, which is bent over outwards and downwards and reached under by locking segments of lid 3, designed as clamping jaws 6, specifically with an interposed seal 7, which is designed as a continuous sealing profile, where, however, only part of seal 7 is shown in FIG. 1.

When lid 3 is in place, seal 7 rests on upward-facing sealing surface 8, formed by bent-over pot edge 5.

In the known manner, lid 3 encompasses a roughly centrally located knob 9, a pressure valve 10 and an operating mechanism, still to be described below, for locking and releasing clamping jaws 6.

FIGS. 1 to 4 illustrate one variant of cooking vessel 1 according to the invention, whereas an alternative development is shown in FIGS. 5 and 6.

For reasons of clarity, the practical example illustrated in FIGS. 1 to 4 will be described in more detail first. As can particularly be seen in the top view, clamping jaws 6 are designed as circular arcs, which enclose almost 180° of the lid circumference, and thus of pot edge 5. As can be seen from FIG. 1, the cross-section of clamping jaws 6 is designed as a U-section, where limb 11a of the clamping jaws, which points towards pot 2, reaches under pot edge 5 over almost the entire circumference (referred to both clamping jaws 6) when in locked state (see FIG. 3).

Opposite limb 1ib of the clamping jaws rests on lid 3. As a whole, the clamping jaws reach around lid 3 and pot edge 5, seal 7 being interposed.

Number 12 denotes the pivot about which the two clamping jaws 6 are arranged in pivoting fashion in the plane of pot edge 5 and in the plane of lid 3. At the same time, clamping jaws 6 are fastened to lid 3 via pivot 12.

Provided on the ends of clamping jaws 6 remote from pivot 12 are lever extensions 13 with driving pins 14, where the driving pins extend roughly parallel to the longitudinal centre line of cooking vessel 1 (out of the drawing plane in FIG. 2). Driving pins 14 are guided in slot-like openings 15 of a control plate 16, which can be moved in linear fashion. Openings 15 in control plate 16 form a sliding guide for clamping jaws 6, where displacement of control plate 16 from the longitudinal centre line of cooking vessel 1 towards pot edge 5 causes the clamping jaws reaching under pot edge 5 to swing open into the released position illustrated in FIG. 2, and where movement of control plate 16 towards the longitudinal centre line of cooking vessel 1, into the position shown in FIG. 4, causes the clamping jaws to swing in and lid 3 to be locked. During this process, driving pins 14 slide into the position shown in FIG. 4 in openings 15.

The operating movement of control plate 16 is brought about by a toothed lever 18, mounted in pivoting fashion in knob 9, its toothing 18a engaging rack 18b of control plate 16. As can be seen by examining FIGS. 3 and 1 together, lifting of toothed lever 18 out of knob 9 results in displacement of control plate 16 towards pot edge 5, and opening of clamping jaws 6. Control plate 16 is located beneath a cover 19 to afford protection against access.

An alternative variant of the cooking vessel according to the invention is illustrated in FIGS. 5 and 6. Identical components are identified by identical reference numbers.

In the practical example illustrated in FIGS. 5 and 6, driving pins 14 are mounted directly on the ends of clamping jaws 6. Driving pins 14 are guided in openings 15 in two control levers 20, which are mounted in pivoting fashion. Control levers 20 are mounted in pivoting fashion about pivots 21a and 21b of lid 3. Control levers 20 are arranged relative to each other in the manner of scissor elements and, when in the locked position of clamping jaws 6 illustrated in FIG. 5, form two operating arms 22 positioned a distance away from each other, as well as two almost touching guide arms 23 extending parallel to each other. On the sides facing each other in the area of pivots 21a, 21b, control levers 20 are each provided with toothing 24, where the individual teeth of control levers 20 intermesh, such that toothing 24 serves as a synchronisation device for synchronising the pivoting movement of control levers 20.

As already mentioned above, driving pins 14 of the clamping jaws are mounted in pivoting and sliding fashion in openings 15 on the ends of guide arms 23 pointing towards clamping jaws 6. As in the previously described practical example, slot-like openings 15 act as a sliding guide for clamping jaws 6 when opening and closing them.

Pressure on operating arms 22 in the position of control levers 20 illustrated in FIG. 5 causes guide arms 23 to swing apart and clamping jaws 6 to swing open into the released position shown in FIG. 6.

Operating arms 22 can, for example, be moved via an eccentric disc that is located in knob 9, or on knob 9, and rotates with it. In this way, rotation of knob 9 about the longitudinal centre line of cooking vessel 1 would bring about outward movement of the operating arms for the purpose of locking.

In the practical example described, operating arms 22 are provided directly for manual operation by the user. It is then likewise expedient if they are retained in their spread position by spring force, or if clamping jaws 6 are retained in their locked position by spring force. To this end, spring elements are provided in the form of flat spiral springs 25, which are arranged around pivots 21a, 21b and only indicated generally in the drawing.

Cooking Vessel

LIST OF REFERENCE NUMBERS

1 Cooking vessel
2 Pot
3 Lid
4 Handle
5 Pot edge
6 Clamping jaw
7 Seal
8 Sealing surface
9 Knob
10 Pressure valve
11a, b Limbs of the clamping jaws
12 Pivot
13 Lever extension
14 Driving pin
15 Opening
16 Control plate
17 Safety valve
18 Toothed lever
18a Toothing
18b Rack
19 Cover
20 Control level
21a, b Pivots
22 Operating arm
23 Guide arm
24 Toothing
25 Flat spiral spring

The invention claimed is:

1. Cooking vessel, particularly a steam pressure cooker, comprising a pot-like container and a lid provided for pressure-tight sealing of the container, where the container displays a circumferential, outwardly bent or flanged pot edge, wherein clamping jaws are provided on the lid, which serve as locking segments and can be moved into an open or locked position parallel to the plane of the pot edge, wherein the clamping jaws reach under the pot edge in the locked position, the clamping jaws each extend over almost half the circumference of the lid, and the clamping jaws are mounted in a manner permitting pivoting movement about a pivot extending parallel to, and at a distance from, the longitudinal centre line of the container, characterised in that the pivoting movement of control levers is provided with a synchronization device, further characterised in that the clamping jaws remote from the pivot are connected in pivoting fashion to the control levers, which are in turn each mounted on the lid in pivoting fashion and transmit an opening and closing movement to the clamping jaws, and that the pivoting movement of the control levers is coupled via the synchronization device.

2. Cooking vessel according to claim 1, characterised in that the clamping jaws are connected to each other via the pivot, which extends through the edge area of the lid.

3. Cooking vessel according to claim 1, characterised in that the control levers include openings and each display an operating arm and a guide arm, where the guide arm is in each case actively connected to a clamping jaw.

4. Cooking vessel according to claim 3, characterised in that the clamping jaws are each guided via driving elements in openings of the control levers.

5. Cooking vessel according to claim 1, characterised in that the control levers engage each other via toothing.

6. Cooking vessel according to claim 1, characterised in that the clamping jaws are retained in the closed position by spring force.

7. Cooking vessel according to claim 1, characterised in that the clamping jaws are guided via driving elements in openings in a control plate, which, in turn, can be displaced in linear fashion via an operating element and brings about an opening and closing movement of the clamping jaws.

8. Cooking vessel according to claim 7, characterised in that the control plate displays a rack, and in that the operating element is designed as a toothed lever engaging the rack.

9. Cooking vessel according to claim 1, characterised in that the control levers are arranged relative to each other in the manner of scissor elements and are provided with each one guide arm, which is connected to one of the clamping jaws, and which has one operating arm where pressure on the operating arms causes the guide arms to swing apart and thus the clamping jaws to swing open.

* * * * *